United States Patent

[11] 3,624,154

[72] Inventors Lanny A. Robbins;
        Edward R. Winkler, both of Midland, Mich.
[21] Appl. No. 23,080
[22] Filed Mar. 26, 1970
[45] Patented Nov. 30, 1971
[73] Assignee The Dow Chemical Company
        Midland, Mich.

[54] CONCENTRATION OF AQUEOUS ACRYLAMIDE
    8 Claims, No Drawings
[52] U.S. Cl. ............................................. 260/561 N
[51] Int. Cl. ........................................... C07c 103/00
[50] Field of Search ................................. 260/561 N

[56]           References Cited
        UNITED STATES PATENTS
3,489,512  1/1970  Okuno et al. .......... 260/561 N X

*Primary Examiner*—Lewis Gotts
*Assistant Examiner*—Ethel G. Love
*Attorneys*—Giswold & Burdick, D. H. Thurston and C. E. Rehberg

ABSTRACT: Aqueous solutions containing up to about 25 percent by weight of acrylamide are concentrated to a maximum concentration of about 30 percent by cooling the less concentrated solutions to produce a mush of ice crystals and separating the ice from the mother liquor. Adiabatic cooling under reduced pressure is preferred.

CONCENTRATION OF AQUEOUS ACRYLAMIDE

BACKGROUND OF THE INVENTION

The present invention relates to a novel process for concentrating relatively dilute aqueous solutions of acrylamide.

Acrylamide is a useful monomer for making water-soluble and water-swellable homopolymers and copolymers. It is made commercially by hydrolyzing acrylonitrile. A known hydrolysis process comprises the reaction of about equal molar proportions of 80–90 percent sulfuric acid and acrylonitrile and the subsequent neutralization of the acid reaction mixture with a base or by treatment with a suitable ion exchange resin. Jones U.S. Pat. No. 3,734,915 describes a process using the latter method wherein the acrylamide sulfate product is diluted with water and the solution is passed over an ion exchange resin. Absorbed acrylamide is eluted with water. A more recent process is based on catalytic hydrolysis of aqueous acrylonitrile using a heterogeneous metal catalyst such as copper chromite, as disclosed by Habermann et al. in copending application Ser. No. 835,765 filed June 23, 1969 and owned by a common assignee. Relatively dilute aqueous acrylamide may be obtained as the product stream from such processes. Such dilute product streams can be concentrated, either as the first step in separating pure solid acrylamide, the usual commercial form, or to make a relatively concentrated solution which may be used as such in some applications. Concentration of such dilute solutions has been accomplished in the past by methods such as the evaporation of water, spray drying or azeotropic distillation with an organic solvent. Since acrylamide is somewhat sensitive to heat and is also subject to further hydrolysis or polymerization, these known methods of concentration have their disadvantages and limitations.

It is known that fresh water can be made by freezing out ice from sea water and returning the concentrated brine mother liquor to the ocean. However, such techniques have not been applied to removal of water from aqueous organic solutions, particularly where the organic component is monomer which is easily hydrolyzed or polymerized.

SUMMARY OF THE INVENTION

Concentration of dilute aqueous acrylamide by crystallizing ice from the solution has now been found to be not only an efficient and economically practical process, but also a process which affords good yields of concentrated acrylamide solution with little or no loss to hydrolysis, polymerization, or other form of degradation of the monomer often encountered in known concentration methods. The present invention is a process which comprises cooling a solution consisting essentially of up to about 25 weight percent of acrylamide in water to a temperature in the range below its freezing point but above the eutectic point of the solution, agitating the cooling solution meanwhile by a stirrer or other mixing means so as to form a fluid mush of ice crystals in concentrated aqueous acrylamide mother liquor, and separating the ice crystals from the mother liquor. The process can be run as a series of such freezing and separation stages, but it is operated most efficiently as a continuous process with recycle of at least a portion of the mother liquor in order to limit the relative proportion of ice while the concentration of acrylamide in the mother liquor is increased to a desired level.

DETAILED DESCRIPTION

The freezing step is preferably carried out at −1° to about −9° C., most preferably at −2° C. to −8° C., to obtain a mush of ice crystals of sufficient fluidity for convenient handling. A moderate amount of agitation during freezing is necessary to assure proper heat transfer and also to prevent the formation of a surface layer of solid ice. Freezing to a point where the ice crystal-mother liquor mixture contains 10–40 percent by weight of ice is a practical range of operation. Separation of ice crystals can be accomplished by any conventional means, preferably by filtration. Some mother liquor adheres to the ice crystals and a washing step to minimize this loss is usually desirable. Some of the separated ice can be melted and used as a wash to dissolve the adhering liquor or an organic solvent can be used to flush the liquor from the crystals and separate it as an aqueous layer in the flushing solvent. Hydrocarbon and chlorinated hydrocarbon solvents such as kerosene, benzene, chlorobenzene, or ethylene dichloride are suitable organic solvents for such flushing action. Where a water-immiscible solvent is used for this purpose, the resulting wash liquid can be run through a decanter to recover the aqueous mother liquor layer and both the solvent and the recovered aqueous liquor can be returned to the process, the solvent to the flushing step and the mother liquor to the aqueous acrylamide feed. If water is used to wash the crystals, the aqueous wash is also suitably returned to the process in the acrylamide solution feed.

A convenient and efficient means of cooling the aqueous acrylamide feed is by adiabatic vaporization of water from the feed solution under reduced pressure. The properties of water to make this an attractive choice since the heat absorbed to vaporize one part of water supplies sufficient cooling to freeze about eight parts of ice. This mode of operation entails operating at conditions close to the triple point of water where ice, water, and water vapor are at equilibrium. A reduced pressure of the order of 1–14 mm. is required with a temperature as previously defined. A temperature and pressure combination where both are slightly below the theoretical triple point values is indicated.

In a preferred batchwise operation, aqueous acrylamide of 5–25 percent concentration is stirred and cooled to about −1° to −8° C. at about 1–14 mm. Hg. absolute pressure, thereby converting a portion of the water to vapor and another portion to ice at the same time. When the ice fraction in the freezing mush reaches a proportion of 10–40 percent, preferably 20–30 percent of the whole, the mush is pumped or otherwise transferred to a filter where the ice is separated and washed substantially free of adhering mother liquor using water obtained from a previous freezing stage. The mother liquor can be concentrated further by recycling at least a portion of it to the freezing step. Since acrylamide and water form a eutectic mixture containing about 31 percent of acrylamide and freezing at about −9° C., the maximum concentration attainable by this process is about 30 percent.

The process can be operated continuously under similar conditions with continuous aqueous feed and continuous removal of ice and mother liquor. Mother liquor is recycled continuously to maintain the proportion of ice at a desired level, for example, about 25 percent. Mother liquor is removed continuously after the acrylamide content has reached a desired predetermined value at a rate calculated to maintain that desired value.

EXAMPLE

A solution of 30 g. of acrylamide in 200 g. of water (13 percent by weight) was stirred and cooled by a dry ice-acetone bath below its initial freezing point of about −3.2° C. When the crystal slurry had reached an equilibrium at −5° C., the crystals were separated on a cooled suction filter and were washed with 25g. of cold water. Examination of the various fractions thereby obtained revealed the following:

|  | Mother Liquor | Washed Crystals | Wash Water |
|---|---|---|---|
| Weight, g. | 116.8 | 103.0 | 32.4 |
| % Acrylamide | 18.3 | 3.9 | 15.7 |
| g. Acrylamide | 21.3 | 4.0 | 5.1 |
| g. Water | 95.5 | 99.0 | 27.3 |

Evidently, the water used for washing had frozen and the recovered wash liquid was largely displaced mother liquor. However, concentration of aqueous acrylamide to about 18 percent by weight from an original 13 percent solution in one stage was demonstrated.

A considerable improvement in efficiency is obtained and the acrylamide solution is thereby concentrated to a final value of 25–30 percent when a portion of the separated ice is melted and recycled for use as wash water in a continuous one stage or multistage operation as described in the example. The aqueous wash liquor can be combined with the concentrated mother liquor and the whole then concentrated in a second freezing stage as described above in a stepwise fashion or continuously with continuous addition of feed and removal of product. By recycling a portion of the mother liquor, further concentration can be accomplished in a single stage.

We claim:

1. A process for concentrating an aqueous solution of acrylamide which comprises cooling a solution consisting essentially of 5–25 weight percent of acrylamide in water to below its freezing point but above the eutectic point of the solution, agitating the cooling solution, thereby converting said solution to a fluid mush of ice crystals in aqueous acrylamide mother liquor, and separating said ice crystals from said mother liquor.

2. The process of claim 1 wherein the solution is cooled to about −1° C. to about −9° C.

3. The process of claim 2 wherein the fluid mush of ice crystals contains 10–40 percent by weight of said crystals.

4. The process of claim 1 wherein the solution is cooled by adiabatic vaporization of water from the acrylamide solution under reduced pressure.

5. The process of claim 1 wherein adhering mother liquor is washed from the separated ice crystals with water or a water-immiscible organic solvent.

6. The process of claim 5 wherein the separated ice crystals are washed with water and the water wash is recycled to the process.

7. The process of claim 6 wherein there is continuous addition of aqueous feed with continuous removal of ice and mother liquor and continuous recycle of a portion of the mother liquor to the process.

8. The process of claim 7 wherein the rate of removal of mother liquor is adjusted to maintain the acrylamide concentration therein at a predetermined value.

* * * * *